United States Patent [19]

Mueller et al.

[11] Patent Number: 4,948,011

[45] Date of Patent: Aug. 14, 1990

[54] METHOD AND APPARATUS FOR DESTACKING CONTAINERS

[75] Inventors: Martin J. Mueller, Palm Harbor, Fla.; Martin Mueller, Sr., Wonderlake, Ill.

[73] Assignee: Osgood Industries, Inc., Oldsmar, Fla.

[21] Appl. No.: 292,555

[22] Filed: Dec. 30, 1988

[51] Int. Cl.⁵ .............................................. B65G 59/06
[52] U.S. Cl. ........................................ 221/1; 221/93; 221/123; 221/223; 221/236; 221/238; 221/251; 221/262; 414/795.6
[58] Field of Search ............ 221/1, 93, 123, 221, 221/223, 224, 225, 236, 238, 251, 262; 414/795.6, 797.4, 798.1, 798; 141/173–175

[56] References Cited

U.S. PATENT DOCUMENTS

| | | |
|---|---|---|
| 3,440,794 | 4/1969 | Mueller . |
| 3,472,403 | 10/1969 | Mueller et al. . |
| 3,526,075 | 9/1970 | Mueller et al. . |
| 3,659,744 | 5/1972 | Byrd et al. .................. 221/1 |
| 4,054,212 | 10/1977 | Mueller ..................... 221/221 X |
| 4,157,767 | 6/1979 | Schjeldahl ................ 221/251 X |
| 4,529,101 | 7/1985 | Orlowski .................. 221/223 X |

Primary Examiner—Kevin P. Shaver
Assistant Examiner—David H. Bollinger
Attorney, Agent, or Firm—Dressler, Goldsmith, Shore, Sutker & Milnamow

[57] ABSTRACT

An apparatus and method for destacking and dispensing cup-like containers, such as for use in association with an automated product packaging machine, are disclosed. The apparatus includes pairs of upper and lower jaws associated with each stack of containers received by the apparatus. Both the upper and lower jaws are mounted for movement inwardly and outwardly relative to each stack, with the lower jaws further mounted for vertical movement relative to the upper jaws. By this arrangement, the lower jaws can be operated to destack and separate the lowermost container of each stack, so that the separated container is received on a product conveyor of the packaging machine.

6 Claims, 10 Drawing Sheets

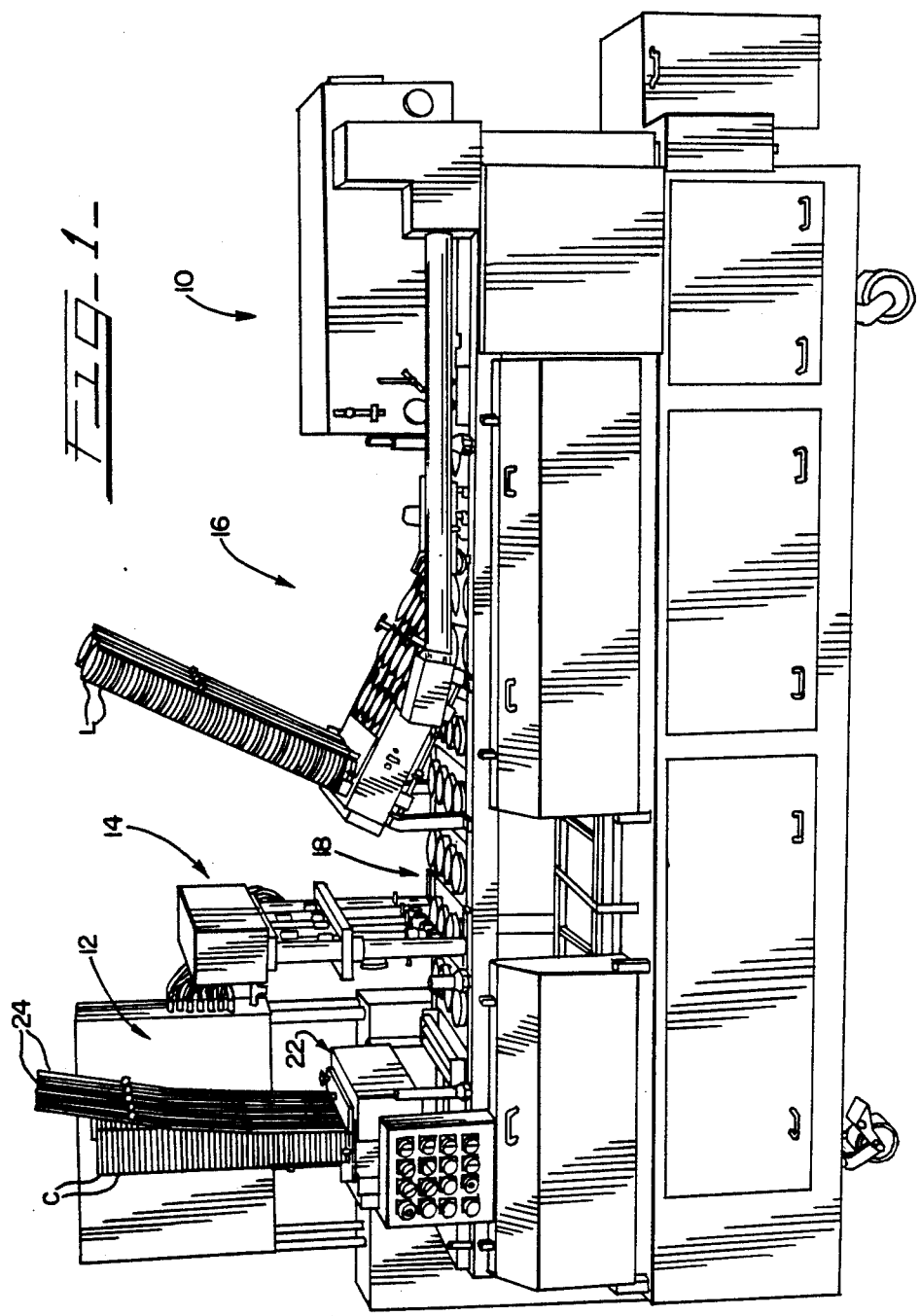

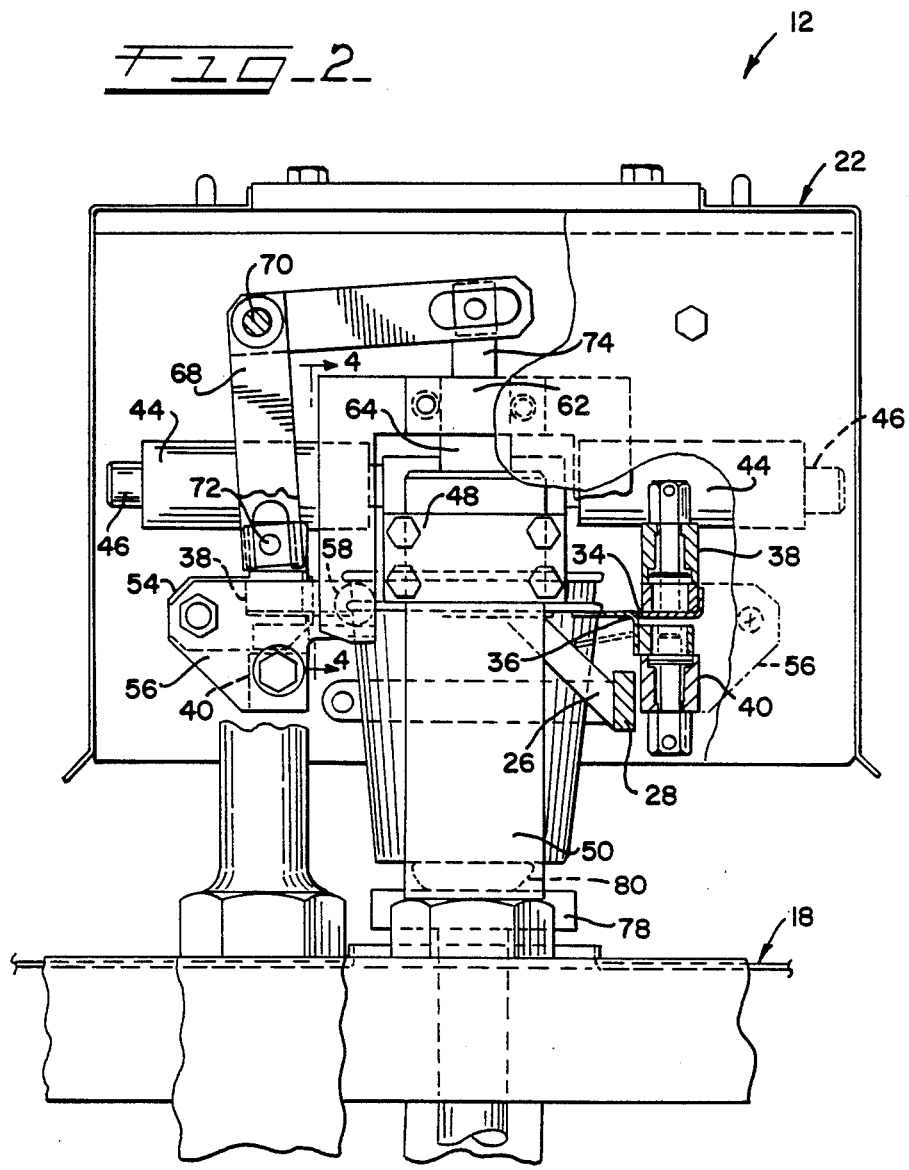

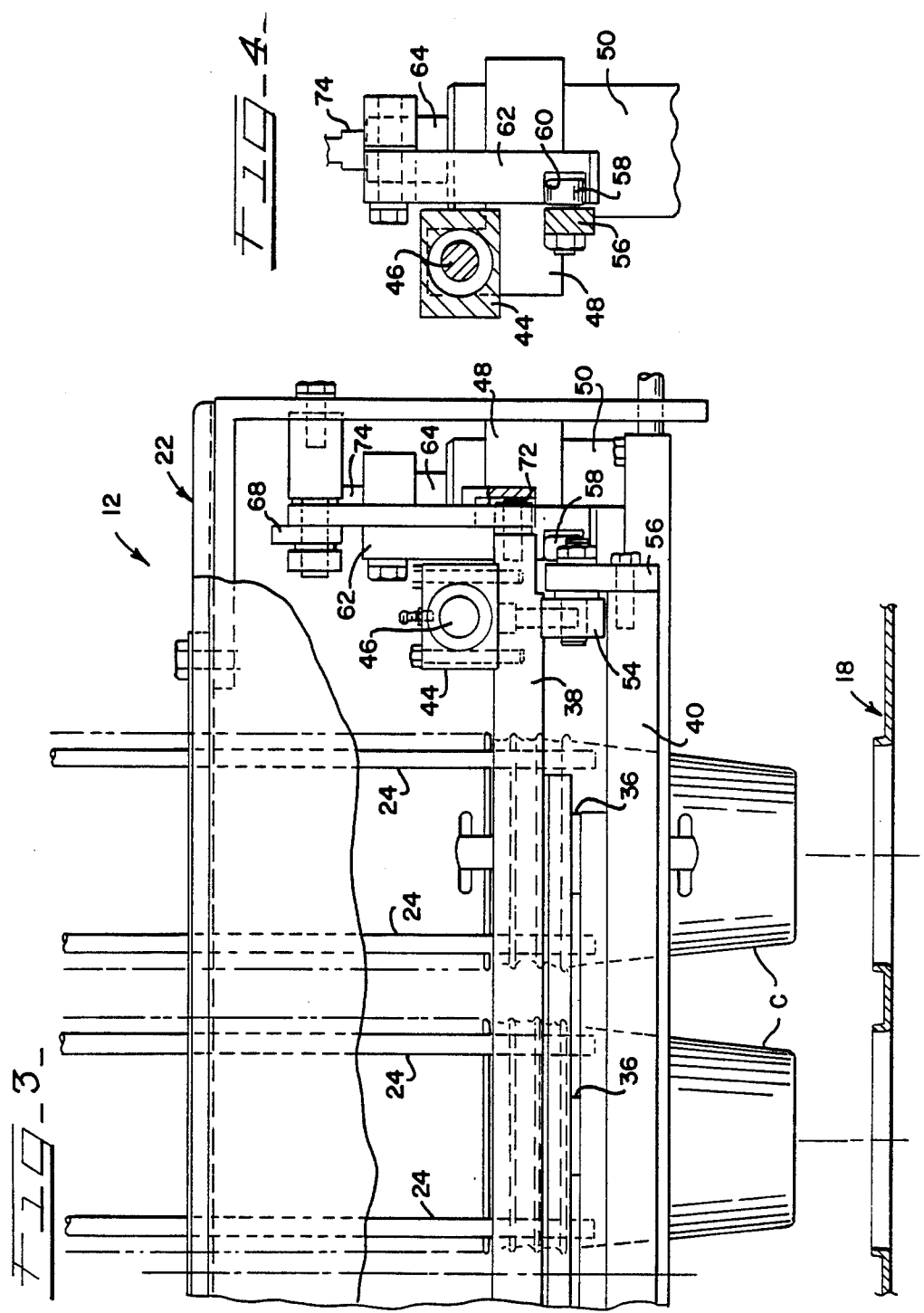

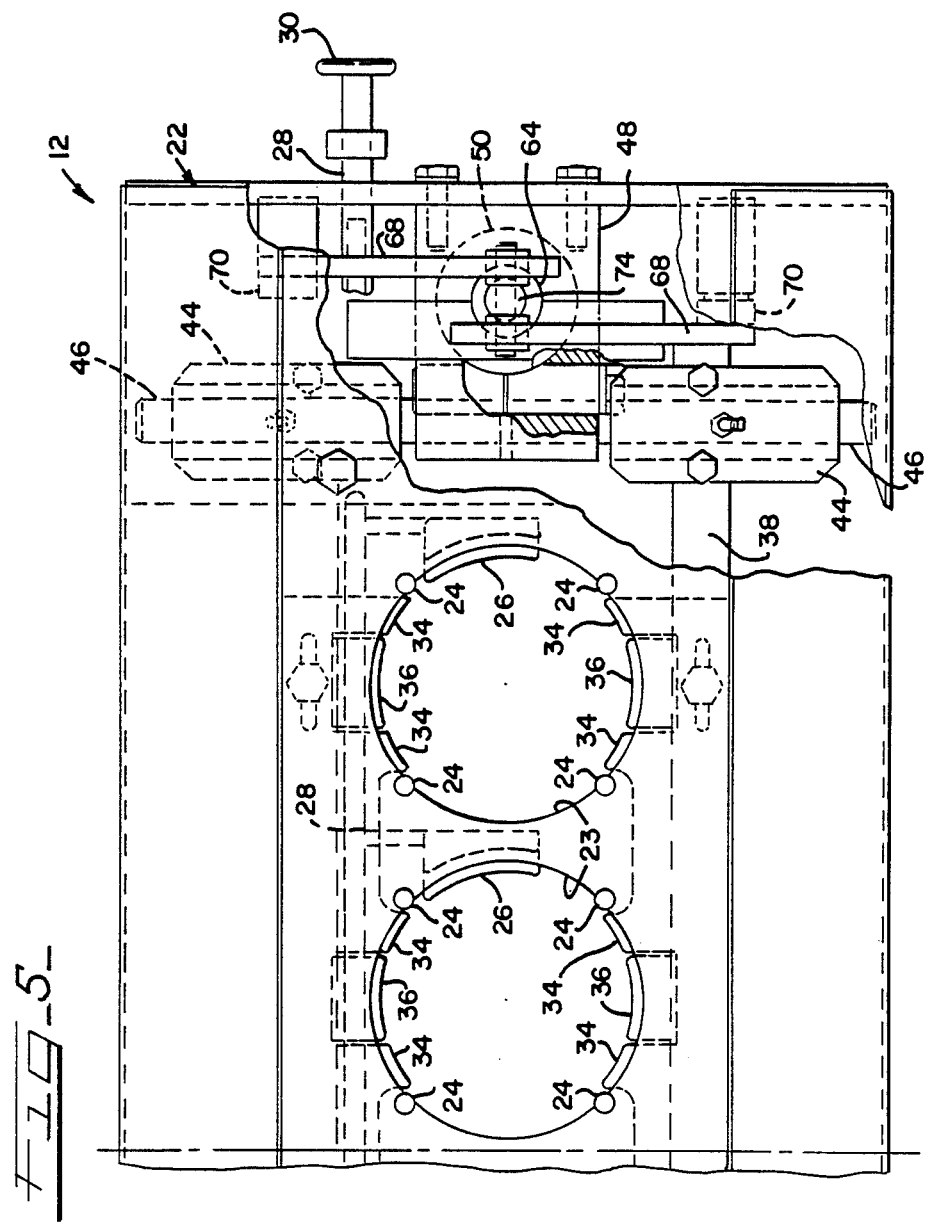

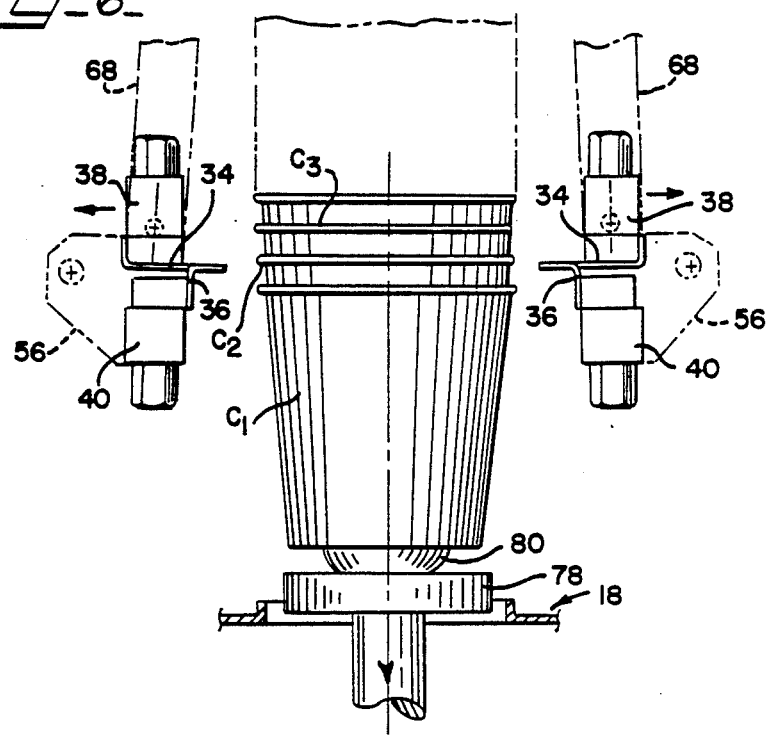
FIG-6-
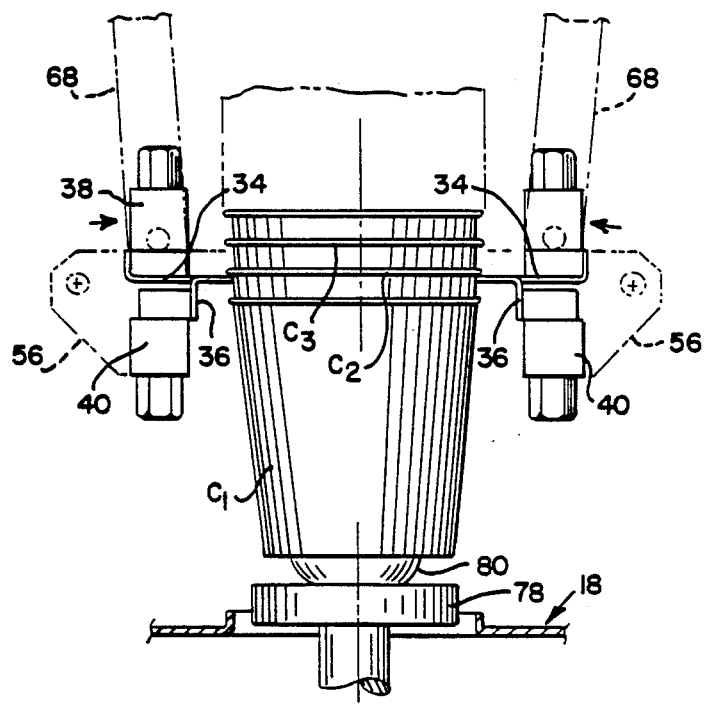
FIG-7-

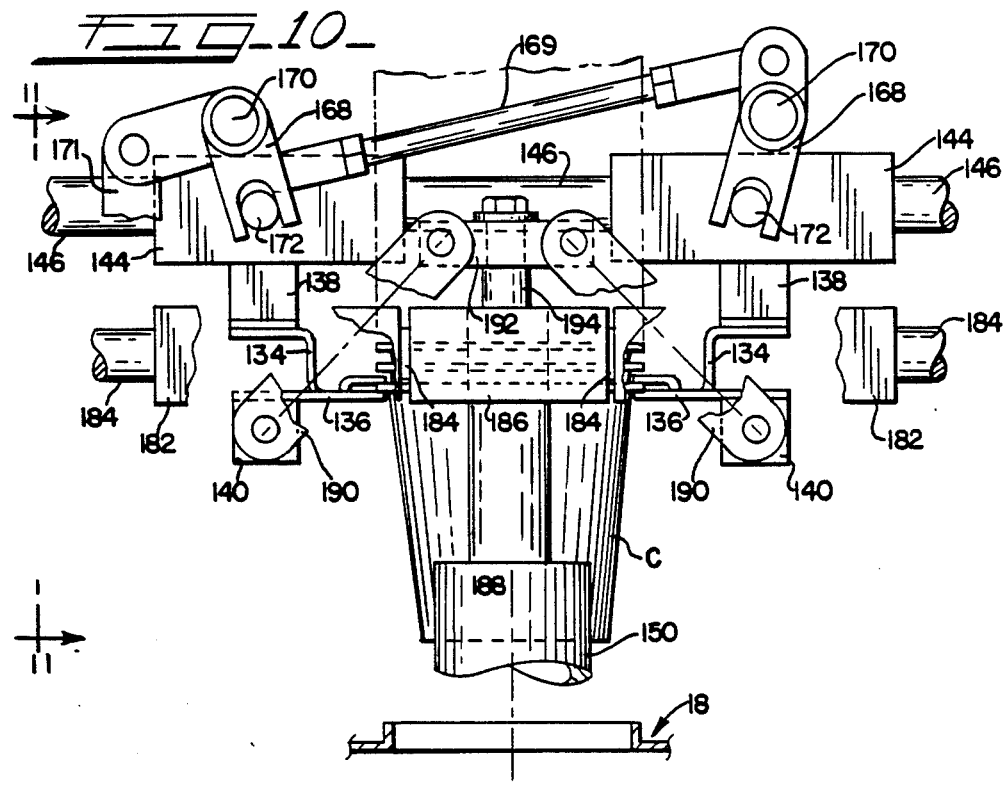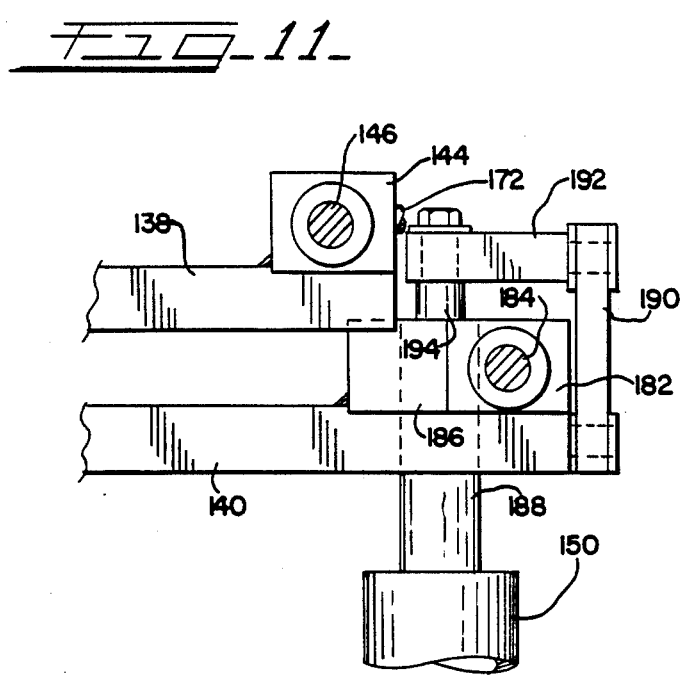

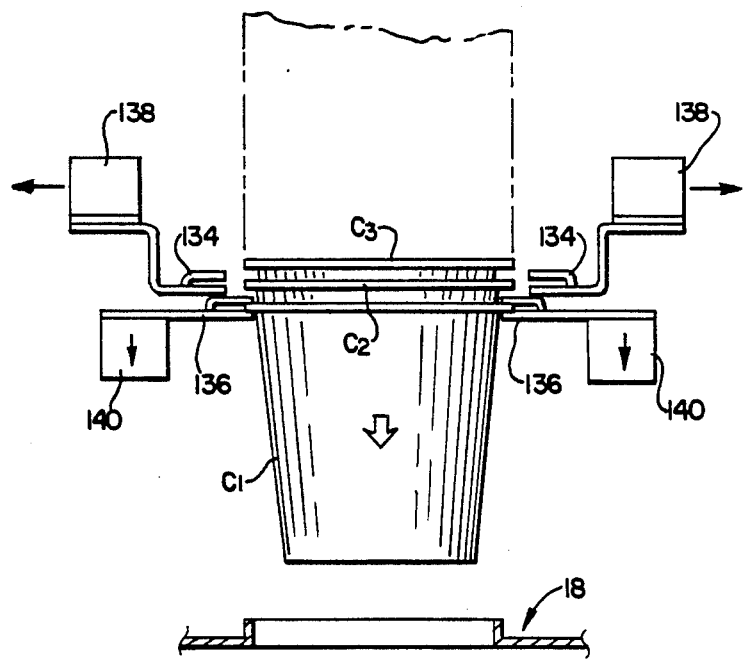

METHOD AND APPARATUS FOR DESTACKING CONTAINERS

TECHNICAL FIELD

The present invention relates generally to product packaging equipment, and more particularly to a method and apparatus for sequentially destacking and dispensing nested, cup-like containers for subsequent product filling.

BACKGROUND OF THE INVENTION

Efficient product packaging is facilitated by the use of automated equipment which is configured to receive and handle unfilled product packages, and thereafter effect filling and closing of the packages. For packaging of food products such as ice cream, cottage cheese, and the like which are generally flowable in nature, the use of cup-like containers has found widespread acceptance.

Containers of this type are generally cylindrical and define an upper annular rim portion, but are typically not truly cylindrical, in that the side walls of the containers taper downwardly and inwardly. By virtue of this configuration, the containers are readily nestable within each other, whereby stacks of the nested containers can be efficiently stored and handled. Subsequent to filling of the individual containers with a food product or the like, a suitable lid is applied to the container at the upper rim portion thereof, with the filled containers further packaged, as may be required, for shipment and storage.

As will be appreciated, efficient filling of such nested containers requires efficient and consistent destacking of individual ones of the containers from stacks thereof. For example, the failure to effect the desired destacking of a container, or the inadvertent destacking of two containers simultaneously, can lead to jamming or other problems with the packaging equipment, thereby undesirably resulting in downtime. The need for consistent and reliable destacking is complicated by the nestable configuration of typical containers, in that the closely nesting configuration of the containers tends to inhibit their separation by virtue of the suction or vacuum created between their closely confronting surfaces as they are drawn apart.

In view of these operating requirements, highly positive and precise handling during destacking is mandated. One such apparatus for effecting such destacking is disclosed in U.S. Pat. No. 3,659,744, to Byrd, et al., wherein movable plates are provided in operative association with stacks of containers for destacking the lowermost container of each stack. However, the apparatus of this patent contemplates that destacking be effected by vertically moving a stack of nested containers, while the lowermost container is retained against movement by a pair of the movable plates and an associated suction cup mechanism. As such, the entire apparatus must be configured so as to effect vertical movement of all of the stacks of containers being handled, bearing in mind that each stack preferably includes a large number of containers to facilitate extended operation of the apparatus without reloading of the container stacks. Additionally, experience has shown that this type of apparatus requires the application of relatively strong suction to the lower surface of each container during destacking, thus further complicating the operation.

In view of the foregoing, it is desirable to provide a container destacking apparatus which avoids the shortcomings of previous known designs, while providing efficient and consistent destacking of individual containers from nested stacks thereof.

SUMMARY OF THE INVENTION

The present invention is directed to an apparatus and method for effecting destacking of containers from nested stacks thereof. Notably, the apparatus includes a desirably straightforward arrangement of movable upper and lower jaws which are operated so as to positively move the lowermost container from a stack, as the remainder of the stack is held in a vertically fixed position. Precise, high-speed destacking is thereby facilitated, with the arrangement desirably configured to avoid the need for lifting vertical stacks of the containers for effecting separation and destacking of the lowermost container.

In the illustrated embodiment, the present destacking apparatus is shown incorporated into a automated packaging apparatus including container dispensing, product filling, and lid applying stations. An intermittently operated product conveyor extends between the stations for indexed movement, whereby one or more containers are dispensed onto the conveyor by the present destacking apparatus, with the containers thereafter filled with product. The containers are then advanced in an indexed, intermittent manner by the conveyor to a lid dispensing apparatus for application of lids thereto. Filling and closing of the containers is thus complete.

The present destacking apparatus is positioned so as to extend transversely of and span the packaging apparatus conveyor. The destacking apparatus includes an arrangement for receiving at least one nested stack of the containers to be filled, with the containers disposed in an upright orientation. In the typical form illustrated, the apparatus is configured to receive and support four individual stacks of the nested containers in side-by-side relationship, with four containers thus simultaneously dispensed in each cycle of operation of the destacking apparatus.

The destacking and separation of the lowermost container of each stack is effected by pairs of upper and lower jaws positioned in operative association with each of the stacks of containers on respective opposite sides of the stacks. Notably, the upper jaws are mounted for vertically fixed movement inwardly and outwardly relative to each stack. In contrast, the lower jaws are not only movable inwardly and outwardly relative to each stack, but are further mounted for vertical movement relative to the upper jaws.

Jaw actuating linkages are provided for effecting sequential actuation of the upper and lower jaws synchronously with the indexed movement of the associated product conveyor. During a cycle of operation, the jaws are sequentially actuated in the following fashion.

First, the lower jaws of the apparatus are positioned for engagement with the lowermost container in each of the nested stacks thereof. At the same time, the upper jaws are positioned for engagement with the next lowermost container in each nested stack.

Second, the lower jaws are moved downwardly relative to each container stack, and relative to the upper jaws. By this movement, the lower jaws separate and destack the lowermost container from each stack, while each stack is held in position against vertical movement by the upper jaws. The separated and destacked container from each stack is positioned on the product conveyor, whereby indexed movement of the conveyor advances the container to the product fill station of the packaging apparatus.

Finally, during each cycle of operation, the upper and lower jaws are moved outwardly, then inwardly, relative to each stack of containers. This action, in conjunction with support and incremental lowering of each container stack, acts to position the lower jaws for engagement with the succeeding lowermost container in each stack, and further acts to position the upper jaws for engagement with the container thereabove. The cycle of operation is thereafter continuously repeated, with the stacks of containers readily replenished by supply of more nested containers at the top of each stack. Substantially uninterrupted, continuous operation of the packaging apparatus is thus facilitated.

While the two disclosed embodiments of the present apparatus both operate in accordance with the above sequence, the embodiments differ from each other somewhat in the manner in which the upper and lower jaws are moved, and the precise configuration of the jaws. In the first illustrated embodiment, the upper and lower jaws are mounted for movement together, or in unison, inwardly and outwardly of each container stack. Further, the lower jaws are mounted for downward pivotal movement relative to the upper jaws, thereby providing the desired downward movement of the lower jaws during destacking of the lowermost container in each stack.

In the first embodiment, the upper and lower jaws are each configured to fit generally between the rim portions of adjacent ones of the nested containers. In order to permit the desired positioning of the upper jaws, which are fixed vertically but movable inwardly and outwardly, support and incremental lowering of each stack of containers is effected by a vertically movable platform which extends upwardly through the product conveyor. By this arrangement, the platform can be positioned to support a respective stack of the containers, the upper and lower jaws moved outwardly relative to the stack, the stack incrementally lowered by a predetermined distance, and the upper and lower jaws thereafter moved inwardly so that the lower jaws can destack the lowermost container while the stack is supported by the upper jaws. In this embodiment, downward movement of the platform is effected synchronously with downward, destacking movement of the lower jaws.

In the alternate illustrated embodiment, use of the vertically movable, stack supporting platform is unnecessary. In this embodiment, at least the lower jaws of the apparatus are each configured to define a recess for receiving the rim portion of each of the stacked containers. By virtue of this jaw configuration, the lower jaws are employed for supporting and incrementally lowering the container stack by gripping the lowermost container, thus permitting the upper jaws to be moved outwardly, then inwardly, for engagement with the next lowermost container in the stack. As will be appreciated, independent inward and outward movement of the upper and lower jaws is required for operation in this manner, with this alternate embodiment being so configured.

Numerous other features and advantages of the present invention will become readily apparent from the following detailed description, the appended claims, and the accompanying drawings.

BRIEF DESCRIPTION OF THE DRAWINGS

FIG. 1 is a perspective view of a packaging apparatus including a container destacking and dispensing apparatus embodying the principles of the present invention;

FIG. 2 is an end elevational view, partially cut away, of the destacking apparatus embodying the principles of the present invention;

FIG. 3 is a partial elevational view, partially cut-away, of the present destacking apparatus;

FIG. 4 is a view, partially in cross-section, taken along lines 4—4 of FIG. 2;

FIG. 5 is a partial top plan view, partially cut-away, of the present destacking apparatus;

FIGS. 6–9 are diagrammatic views illustrating a cycle of operation of the present destacking apparatus;

FIG. 10 is a diagrammatic, side elevational view illustrating an alternate embodiment of the present destacking apparatus;

FIG. 11 is a view, partially in cross-section, taken along lines 11—11 of FIG. 10; and FIGS. 12–16 are diagrammatic views illustrating a cycle of operation of the alternate embodiment of the present apparatus.

DETAILED DESCRIPTION

Figure 8:
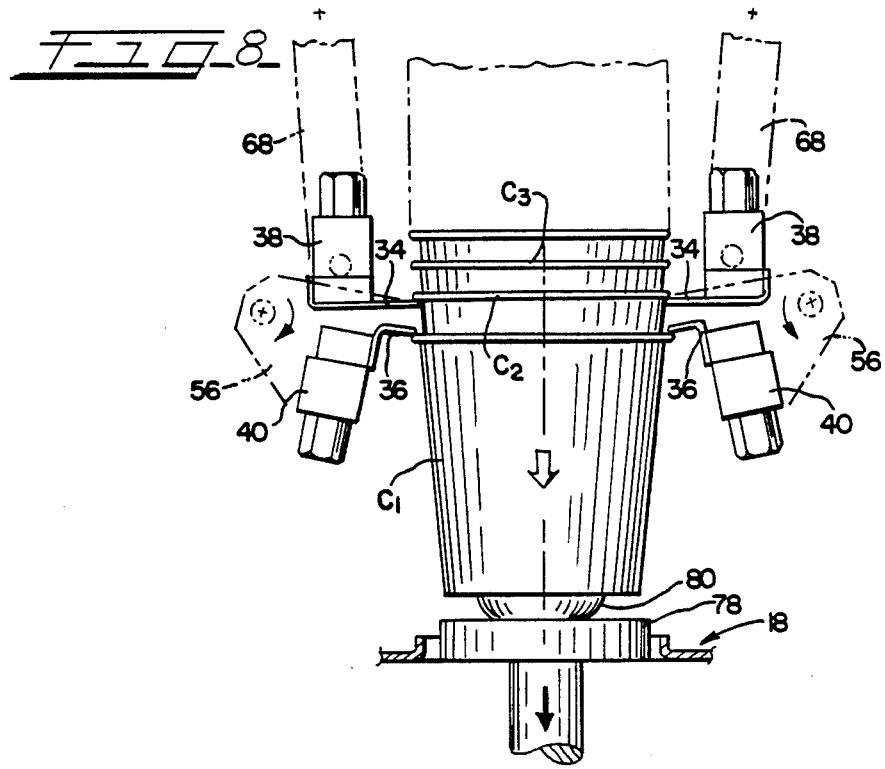

While the present invention is susceptible of embodiment in various forms, there is shown in the drawings and will hereinafter be described first and second embodiments of the invention, with the understanding that the present disclosure is to be considered as an exemplification of the invention, and is not intended to limit the invention to the specific embodiments illustrated.

With reference first to FIG. 1, therein is illustrated an automated product packaging apparatus 10, including an container destacking and dispensing apparatus 12 embodying the principles of the present invention. Packaging apparatus 10 is configured for highly automated, substantially continuous operation, and is particularly suited for use in packaging flowable food products such as ice cream, cottage cheese, and the like. To this end, the container destacking apparatus 12 of the present invention is configured to receive nested stacks of containers C for filling with food product. Generally, apparatus 10 functions such that the lowermost container from each nested stack is separated and destacked therefrom by apparatus 12, and thereafter filled with food product at product dispensing station 14, with container lids L thereafter applied to the containers at a lid applying station 16.

Transport of the containers C through the apparatus is effected by an intermittently operable, indexed product conveyor 18 which extends substantially the length of apparatus 10, and is driven in a closed loop so that its upper run extends beneath destacking apparatus 12, product filling station 14, and lid applying station 16. The filled and closed containers are thereafter removed from the apparatus 10 for any subsequent packaging, storage, and shipment.

Referring particularly to FIGS. 2–5, it will be observed that destacking apparatus 12 is positioned to extend transversely of product conveyor 18, and thus generally span the conveyor. In a typical application, plural stacks of nested containers C would be loaded in the destacking apparatus, with product container 18 being arranged to advance containers in groups corresponding in number to the number of stacks. In the illustrated embodiment, four such container stacks would be received by the destacking apparatus; for purposes of clarity, essentially one-half of the destacking apparatus has been illustrated, with the understanding that its other portion would be of substantially like construction. As will be additionally appreciated, a destacking apparatus embodying the principles of the present invention may readily be configured for handling of a single stack, or various numbers of plural container stacks.

Destacker apparatus 12 is of a desirably straightforward construction, including a housing 22 defining stack openings 23 in which are mounted a plurality of vertically extending stack support rods 24. The housing and the support rods are thus configured to receive and support one or more stacks of the nested containers C, generally in side-by-side relationship to each other. Initial loading and start-up of the apparatus is facilitated by the provision of stack stops 26 (FIG. 5) which are joined to a stop rod 28, which in turn can be moved by a handle 30 for withdrawing the stops 26 for start-up of the apparatus.

The present apparatus includes pairs of cooperating upper and lower jaws which are positioned in operative association with the stacks of nested containers, whereby the lowermost container of each stack is separated and destacked therefrom, while the remainder of the stack is held in a substantially vertically fixed position. More specifically, apparatus 10 includes a pair of concurrently movable upper jaws 34 for each container stack, and similarly a pair of concurrently movable lower jaws 36.

As shown in FIG. 5, each of the upper jaws 34 is preferably of a bifurcated configuration, with a respective one of the lower jaws 36 positioned between the bifurcated portions of the upper jaw. As further illustrated in FIG. 5, a pair of the bifurcated upper jaws 34 are provided generally on respective opposite sides of each container stack (note support rods 24) with a pair of the lower jaws 36 similarly positioned. As will be further described, all of the upper jaws 34 are movable in unison, as are all of the lower jaws 36. To this end, all of the upper jaws 34 are movable horizontally by respective mounting on a pair of elongated upper jaw supports 38, while the lower jaws 36 are similarly movable together by respective mounting on a pair of lower jaw supports 40 (see FIGS. 2, 3).

In this embodiment, the upper jaws 36 and lower jaws 34 are movable inwardly and outwardly relative to the stacks of containers together, or in unison. To this end, upper jaw support 38 is mounted at each of its ends to a suitable linear bearing 44, with the linear bearings 44 at each transverse end of the apparatus mounted on a common horizontal support shaft 46 (see FIG. 2). A shaft support 48 fixedly supports the shaft 46, with the support 48 in turn mounted on vertical tubular support 50 and housing 22.

In order to accommodate inward and outward movement of the upper and lower jaws 34 and 36 in unison, lower jaw support 40 is joined to upper jaw support 38 for movement therewith on support shaft 46. To this end, a pivot support 54 (FIG. 3) depends from each end of each upper jaw support 38, with each support 54 in turn having pivotally mounted thereon a pivot block 56 to which a respective end of one of the lower jaw supports 40 is mounted. By this construction, inward and outward movement of linear bearings 44 on support shaft 46 thus provides inward and outward movement of upper and lower jaw supports 38 and 40 (and thus upper and lower jaws 34 and 36).

An actuating linkage, timed to operate synchronously with the indexed product conveyor 18, pivots the lower jaw support 40, and thus the lower jaws 36, relative to the upper jaw supports 38 and upper jaws 34. The actuating linkage is operatively connected with the pivot blocks 56 by a roller follower 58 (FIG. 4) mounted on each pivot block. Each roller follower 58, in turn, is disposed within a respective groove-like cam track 60, with the cam tracks 60 being provided at respective ends of a generally inverted U-shaped pivot yoke 62. The pivot yoke 62 is joined to a vertically oriented pivotal actuating shaft 64, with the shaft 64 in the illustrated embodiment being tubular, and slidably and concentrically disposed within support 50. The actuating shaft 64 can be operated by any of a variety of suitable actuating arrangements, such as by a suitable cam, solenoid, or fluid cylinder, any of which can be readily operated to provide the desired sequence of operation of the present destacking apparatus.

As illustrated, each of the cam tracks 60 within which the roller followers 58 are disposed extend horizontally of the pivot yoke 62. By this construction, the desired pivotal action of pivot blocks 56, and thus lower jaw supports 40 and lower jaws 36, is effected by vertical movement of yoke 62 by actuating shaft 64. At the same time, this configuration of the roller follower 58 and cam track 60 permits the desired inward and outward movement of the upper and lower jaws 34 and 36, by permitting lateral movement of the followers 58 in the cam tracks 60, with any pivotal movement of the lower jaws 36.

Inward and outward movement of the jaws is effected via a pair of bell cranks 68 (one being shown in FIG. 2) which are mounted on respective crank pivots 70 secured to the housing 22 of the apparatus. Each of the bell cranks 68 is connected to a respective one of the upper jaw supports 38 at a pivotal connection 72. Movement of the bell cranks is effected by an actuating shaft 74, preferably arranged to extend concentrically within pivotal actuating shaft 64. Like the shaft 64, shaft 74 is operated by suitable actuating means to provide the desired sequence of operation for the apparatus. By the illustrated construction, vertical movement of actuating shaft 64 rotates the bell cranks 68 about their respective pivots, which in turn provides the desired inward and outward movement of upper and lower jaw supports 38 and 40, and upper and lower jaws 34 and 36.

In this embodiment of the present invention, a vertically movable platform 78 is provided in operative association with each of the stacks received by the destacking apparatus. As illustrated in FIG. 2, platform 78 extends upwardly through product conveyor 18 during the dwell in the indexed movement of the product conveyor. As will be described, platform 78 not only cooperates with lower jaws 36 to lower the separated and destacked container from the respective stack onto the product conveyor, but further cooperates with the upper and lower jaws to effect support and incremental lowering of the stack of containers for the desired positioning of the stack relative to the jaws. Like the actuating mechanisms for the jaws, the one or more platforms 78 are operated synchronously by appropriate actuating means in the desired timed manner relative to the other components of the apparatus. For some applications, it can be desirable to provide the platform 78 with a suction cup 80, which can be connected to a suitable source of vacuum and thereby provide a gripping force on the destacked container as it is lowered onto the product conveyor.

Referring now to FIGS. 6–9, a cycle of operation of this embodiment of the present apparatus will be described.

Referring first to FIG. 6, the upper and lower jaws 34 and 36, and vertical platform 78 are illustrated just after the platform 78 has been raised, and has now lowered the stack of containers incrementally so that the rim portions of the lowermost container $C_1$ and the next lowermost container $C_2$, are respectively positioned just below and above the elevation of upper and lower jaws 34 and 36. As will be appreciated, this incremental lowering of the stack by platform 78 requires that both the upper and lower jaws be moved to their outer positions relative to the stack (effected by actuation of shaft 74 and bell cranks 68).

In this regard, the platform 78 was first raised to a position so that upon opening, outward movement of the upper and lower jaws 34 and 36, the stack was limited to a minimal "free fall" before resting on the platform 78 for support of the stack.

Referring now to FIG. 7, lowering movement of the platform 78 is temporarily stopped, and upper and lower jaws 34 and 36 moved inwardly by actuation of bell cranks 68. As will be observed, both of the upper and lower jaws are positioned between the rim portions of lowermost container $C_1$ and next lowermost container $C_2$, with the lower jaws 36 thus in position for engagement and destacking of container $C_1$, and with the upper jaws 34 in position for engagement with the next lowermost container $C_2$ to thereby hold the stack of containers in position against movement while the lowermost container $C_1$ is destacked.

FIG. 8 illustrates destacking of lowermost container $C_1$. While upper jaws 34 hold the stack, lower jaws 36 are pivoted downwardly (by operation of yoke 62 acting through roller followers 58 on pivot blocks 56). During this downward movement of the lower jaws 36, platform 78 is moved downwardly in synchronization with the pivotal movement of the lower jaws. The lower jaws 36 provide the desired positive mechanical separation and destacking of the lowermost container, thus breaking any suction which may exist between container $C_1$ and container $C_2$, with suction optionally being applied via suction cup 80 on the platform 78.

Figure 9:
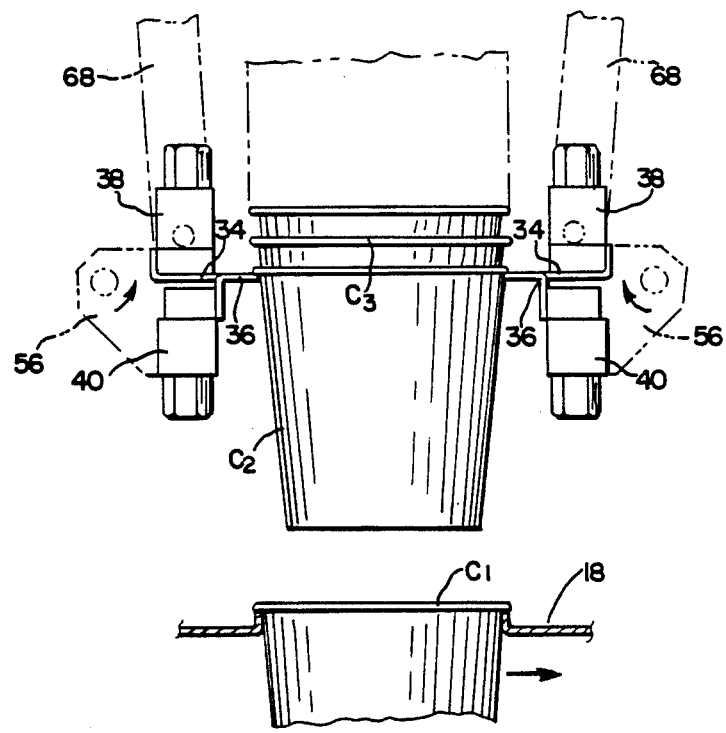

Finally, FIG. 9 illustrates the container $C_1$ in position on product conveyor 18, with the container $C_2$ in position for separation from the next lowermost container $C_3$ during the next cycle of operation. As illustrated, lower jaws 36 are pivoted upwardly to their raised position, with both the upper and lower jaws 34 and 36 being in their inward position relative to the container stack. The cycle of operation is repeated after indexed movement of product conveyor 18, whereupon platform 78 is again raised to support the stack, and thereafter incrementally lower the stack, as the upper and lower jaws are moved outwardly, as shown in FIG. 6.

Referring now to FIGS. 10–16, an alternate embodiment of the present destacking apparatus will be described. In most respects, the alternate embodiment can be configured in accordance with the previously described embodiment, and thus this further embodiment is illustrated generally in diagrammatic form. Components of this further embodiment which generally correspond in function to those of the previous embodiment are identified by like reference numerals in the one-hundred series. As in the previous embodiment, the operating linkages and the like for effecting the desired movement of the apparatus jaw mechanisms can be similarly configured at transversely opposite ends of the apparatus. Therefore, the linkages and mechanisms provided at one of the ends will be described.

As will become evident, this alternate embodiment differs from the previous embodiment in that the use of vertically movable platform 78 with each stack of containers, for supporting and incrementally lowering the stack, is not required. Rather, this alternate embodiment contemplates that at least the lower jaws of the mechanism, and preferably both the upper and lower jaws, are configured to receive a rim portion of each of the containers in the stack for effecting the desired engagement of the jaws with the containers. By this arrangement, the desired support and incremental lowering of the stack is effected by the lower jaws.

As in the previous embodiment, the upper jaws of the mechanism are mounted for vertically fixed, inward and outward movement relative to each stack. Also similarly, the lower jaws are mounted for inward and outward movement, as well as for vertical movement relative to the upper jaws. In distinction from the previous embodiment, the upper and lower jaws can be moved inwardly and outwardly independently, with vertical movement of the lower jaws effected without relative pivotal movement.

Referring first to FIGS. 10 and 11, this alternate embodiment includes a pair of upper jaws 134 positioned at respective opposite sides of each stack of containers, as well as a pair of lower jaws 136 positioned at respective opposite sides of each stack. As in the previous embodiment, upper jaws 134 can be of a bifurcated configuration, such that a respective one of the lower jaws 136 can be fitted between the bifurcated portions of each upper jaw. Also in the previous embodiment, a pair of transversely extending upper jaw supports 138 are provided for respective mounting of the opposite pair of upper jaws 134 for each of the stacks to be handled by the apparatus, with a pair of lower jaw supports 140 similarly provided for mounting of the lower jaws 136.

In distinction from the previous embodiment, both of the upper and lower jaws 134 and 136 are configured to define a recess for receiving a rim portion of each container C. As will be described, this rim receiving configuration of the lower jaws 136 provides the desired means for supporting and incrementally lowering each stack during operation.

As noted, the upper and lower jaws 134 and 136 of this embodiment are movable independently inwardly and outwardly of each container stack. To this end, the upper jaw supports 138 are respectively mounted on linear bearings 144, with the bearings 144 in turn mounted for horizontal movement on a vertically fixed horizontal support shaft 146. Suitable means (not shown) can be employed whereby the shaft 146 is fixedly mounted on the housing or the like of the apparatus.

An actuating linkage is provided for effecting the desired inward and outward movement of upper jaws 134. To this end, a pair of bell cranks 168, joined for concurrent movement by connecting link 169, are mounted on respective vertically fixed pivots 170. A suitable actuating link 171 is joined to one of the bell cranks 168, with the actuating link 171 suitably operated such as by a cam, solenoid, or the like. Each of the bell cranks, in turn, is pivotally connected at 172 to a respective one of the linear bearings 144, whereby operation of actuating link 171 effects inward and outward movement of upper jaws 134.

Inward and outward movement of lower jaws 136, independently of inward and outward movement of upper jaws 134, is effected by the mounting of lower jaw supports 140 on respective linear bearings 182. Linear bearings 182 in turn are mounted on a horizontal support shaft 184.

The support shaft 184 is carried by a shaft support block 186 fixed to a vertically movable tubular actuating shaft 188 extending within a tubular support 150. As will be appreciated, this arrangement provides vertical movement of the lower jaws 136 attendant to vertical movement of actuating shaft 188.

Inward and outward movement of the lower jaws 136 is effected by the provision of a pair of links 190. Links 190 are pivotally connected at the lower ends thereof to the lower jaw supports 140, with the upper ends of the links 190 pivotally connected to a yoke 192. Yoke 192 is fixed to a vertically movable actuating shaft 194, disposed concentrically within actuating shaft 188. Shafts 188 and 194 are suitably operated by cam mechanisms, solenoids, or the like for effecting the desired inward and outward movement of the lower jaws 136 (by vertical movement of shaft 194 relative to shaft 188), as well as the desired vertical movement of the lower jaws 136 (by concurrent and conjoint vertical movement of the shafts 188 and 194).

Referring now to FIGS. 12–16, a cycle of operation for this embodiment of the present destacking apparatus will be described. In FIG. 12, initial incremental lowering of the stack of containers is effected by lowering of lower jaws 136, after upper jaws 134 have been moved outwardly so that they are clear of the stack. As will be observed, the recess-defining lower jaws 136 are configured to receive and grip the rim portion of the lowermost container $C_1$, thus securely supporting the stack during this cycle of operation.

Figure 13:
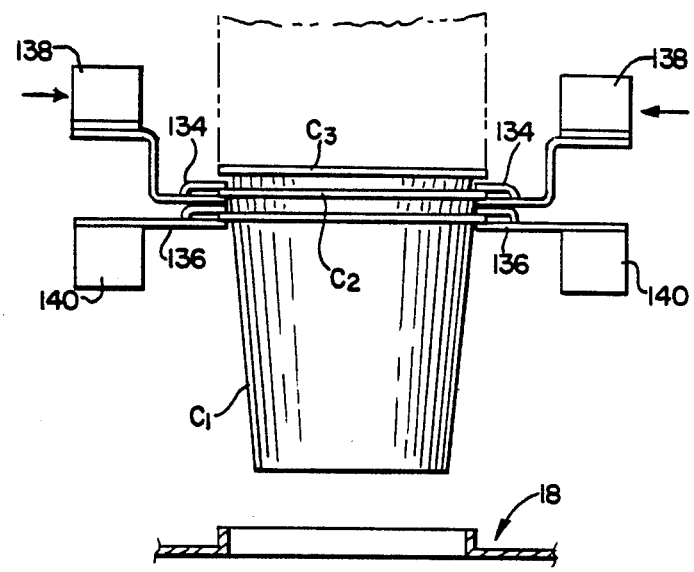

Referring to FIG. 13, vertical movement of the stack is momentarily halted, and upper jaws 134 moved inwardly (via operation of bell cranks 168 by actuating linkage 171). As illustrated, this inward movement of the upper jaws positions them for engagement with the next lowermost container $C_2$ while lower jaws 136 remain positioned for engagement and retention of lowermost container $C_1$.

Figure 14:
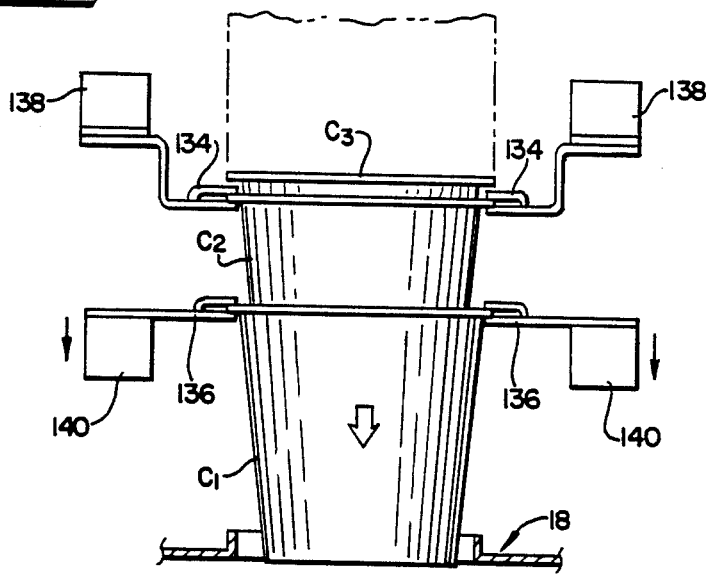

FIG. 14 illustrates destacking of lowermost container $C_1$. As lower jaws 136 are moved downwardly (by concurrent downward movement of shafts 188 and 194), the stack of containers is maintained in position against vertical movement by the upper jaws 134.

Figure 15:
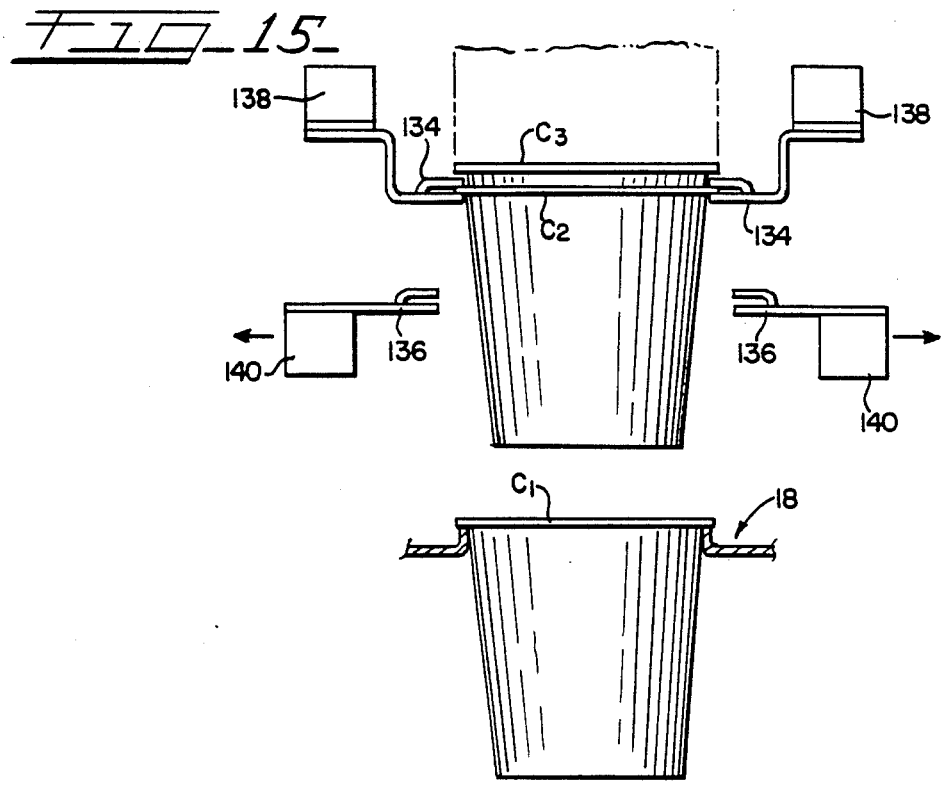

In FIG. 15, outward movement of lower jaws 136 is illustrated, whereupon lowermost container $C_1$ is released and falls into position on product conveyor 18. Outward movement of the jaws 136 is effected by the relative downward movement of shaft 194 within shaft 188. Upper jaws 134 remain in position to hold the stack.

Figure 16:
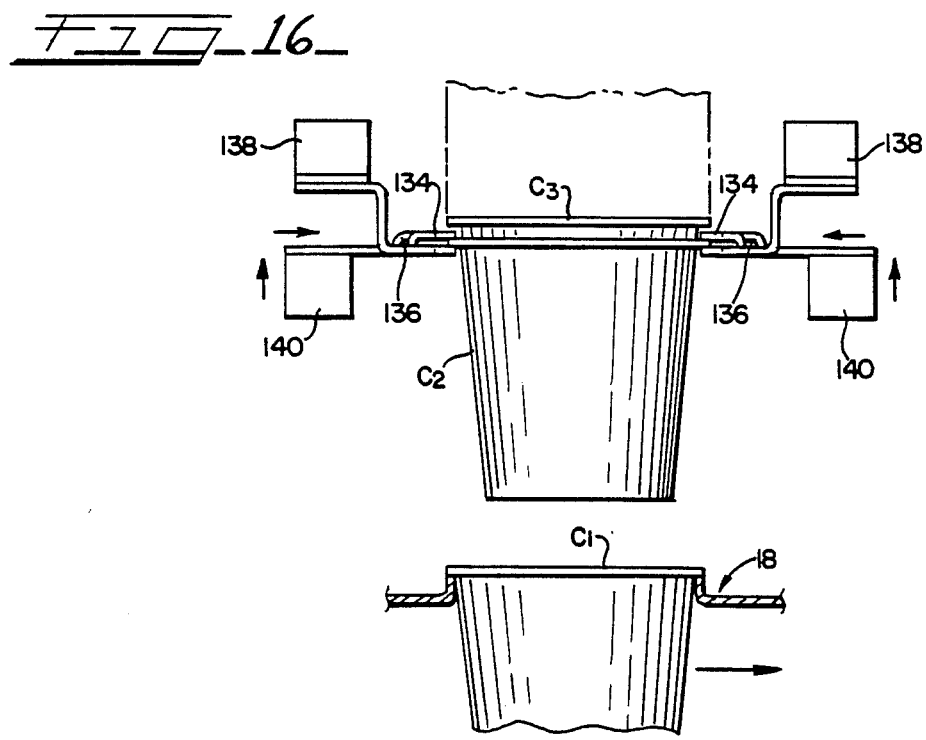

In FIG. 16, upward and inward movement of lower jaws 136 is illustrated whereupon the lower jaws are positioned to receive and hold the next lowermost container $C_2$. Upward movement of the lower jaws is effected by concurrent upward movement of actuating shafts 194 and 188, with inward movement of the jaws effected by relative upward movement of the shaft 194 within the shaft 188. Once the lower jaws 136 have engaged the next lowermost container $C_2$, upper jaws 134 can again be moved outwardly, since the stack will be supported by the recess-defining lower jaws 136. Upon outward movement of upper jaws 138, the stack is again incrementally lowered, as shown in FIG. 12, to repeat the destacking cycle.

From the foregoing, it will be observed that numerous modifications and variations can be effected without departing from the true spirit and scope of the novel concept of the present invention. It will be understood that no limitation with respect to the specific embodiments illustrated herein is intended or should be inferred. The disclosure is intended to cover by the appended claims all such modifications as fall within the scope of the claims.

What is claimed is:

1. An apparatus for destacking containers from a nested stack of the containers comprising:
   stack receiving means for receiving at least one nested stack of said containers;
   upper jaw means positioned in operative association with each said stack of said containers for destacking the lowermost container from each said stack;
   lower jaw means positioned in operative association with each said stack of said containers for destacking the lowermost container from each said stack;
   jaw actuating means for sequentially actuating said upper jaw means and said lower jaw means so that:
   (1) said lower jaw means is positioned for engagement with the lowermost container in each said stack, and said upper jaw means is positioned for engagement with the next lowermost container in each said stack;
   (2) said lowermost jaw means is moved downwardly relative to each said stack to thereby destack the lowermost container therefrom while each said stack is held in position against movement by said upper jaw means; and
   (3) said upper and lower jaw means are moved outwardly, then inwardly, relative to each said stack to thereby position said lower jaw means for engagement with said next lowermost container in each said stack, and to position said upper jaw means for engagement with the container thereabove; and
   jaw mounting means for mounting said upper jaw means for vertically fixed movement inwardly and outwardly relative to each said stack, and for mounting said lower jaw means for movement inwardly and outwardly relative to each said stack independently of said upper jaw means, and for mounting said lower jaw means for vertical movement relative to said upper jaw means.

2. An apparatus for destacking containers in accordance with claim 1, wherein
   said lower jaw means includes means for receiving a rim portion of each said container for effecting engagement therewith to support said nested stack of containers, and said jaw actuating means lowers said lower jaw means for incrementally lowering each said nested stack of containers.

3. An apparatus for destacking containers from a nested stack of the containers comprising:
   stack receiving means for receiving at least one nested stack of said containers;
   upper jaw means positioned in operative association with each said stack of said containers for destacking the lower most container from each said stack;

lower jaw means positioned in operative association with each said stack of said containers for destacking the lowermost container from each said stack;

jaw mounting means for mounting said upper jaws for vertically fixed movement inwardly and outwardly relative to each said stack, and for mounting said lower jaw means for movement inwardly and outwardly relative to each said stack independently of said inward and outward movement of said upper jaw means, and for vertical movement of said lower jaw means relative to said upper jaw means; and jaw actuating means for moving said upper and lower jaw means inwardly and outwardly relative to said stack, and for moving said lower jaw means vertically relative to said upper jaw means to thereby effect destacking of the lowermost container of each said stack by said lower jaw means;

said lower jaw means including means for supporting each said nested stack of containers and said jaw actuating means effecting incremental lowering of each nested stack of containers by downward movement of said lower jaw means.

4. A method of destacking containers from a nested stack of the containers, comprising the steps of:
providing at least one nested stack of said containers;
supporting each said stack in a generally vertical orientation;
providing upper jaw means and lower jaw means, and positioning said upper jaw means and said lower jaw means in operative association with each said stack for destacking the lowermost container from each said stack;
mounting said upper jaw means for vertically fixed movement inwardly and outwardly relative to each said stack, and mounting said lower jaw means for movement inwardly and outwardly relative to each said stack, and for movement vertically relative to said upper jaw means;
actuating said upper jaw means and said lower jaw means for moving said upper and lower jaw means inwardly and outwardly relative to each said stack, and for moving said lower jaw means vertically relative to said upper jaw means to thereby effect destacking of the lowermost container of each said stack by said lower jaw means, including moving said upper jaw means and said lower jaw means independently inwardly and outwardly relative to each said stack;
supporting and incrementally lowering each said nested stack of containers after destacking of the lowermost container therefrom.

5. A method of destacking containers in accordance with claim 4, wherein
said supporting and lowering step includes lowering each said stack relative to said upper jaw means, with said vertically movable lower jaw means by engagement with the lowermost container in each said stack;
said method further comprising positioning said upper jaw means for engagement with the next lowermost container of each stack, and thereafter again moving said lower jaw means downwardly relative to said upper jaw means to effect destacking of said lowermost container from each said stack by said lower jaw means.

6. A method of destacking containers in accordance with claim 4, including
(1) positioning said lower jaw means for engagement with the lowermost container in each said stack, and positioning said upper jaw means for engagement with the next lowermost container in each said stack;
(2) moving said lower jaw means downwardly relative to each said stack to thereby destack the lowermost container therefrom while each said stack is held in position against movement by said upper jaw means; and
(3) moving said upper jaw means and said lower jaw means outwardly, then inwardly, relative to each said stack, and incrementally lowering each said stack, to thereby position said lower jaw means for engagement with the next lowermost container in each said stack, and to position said upper jaw means for engagement with the container above said next lowermost container in each said stack.

* * * * *